United States Patent
Setsuda et al.

(10) Patent No.: US 7,554,270 B2
(45) Date of Patent: Jun. 30, 2009

(54) COMPOSITION FOR DIELECTRIC OF PLASMA DISPLAY PANEL, LAMINATE FOR DIELECTRIC, AND METHOD FOR FORMING THE DIELECTRIC

(75) Inventors: Hitoshi Setsuda, Kawasaki (JP); Akira Kumazawa, Kawasaki (JP); Kiminori Oshio, Kawasaki (JP); Hiroyuki Obiya, Kawasaki (JP)

(73) Assignee: Tokyo Ohka Kogyo Co., Ltd., Kanagawa (JP)

( * ) Notice: Subject to any disclaimer, the term of this patent is extended or adjusted under 35 U.S.C. 154(b) by 550 days.

(21) Appl. No.: 10/554,657

(22) PCT Filed: May 17, 2004

(86) PCT No.: PCT/JP2004/006998

§ 371 (c)(1),
(2), (4) Date: Oct. 25, 2005

(87) PCT Pub. No.: WO2004/107049

PCT Pub. Date: Dec. 9, 2004

(65) Prior Publication Data

US 2007/0042177 A1    Feb. 22, 2007

(30) Foreign Application Priority Data

May 28, 2003    (JP) .................. 2003-150966

(51) Int. Cl.
*H01J 17/49*    (2006.01)

(52) U.S. Cl. .............. 313/586; 313/582; 313/584; 313/587; 445/24; 445/25; 445/26

(58) Field of Classification Search ............ 445/24, 445/25, 26; 313/586–587, 582, 584
See application file for complete search history.

(56) References Cited

U.S. PATENT DOCUMENTS

| 5,714,286 A | 2/1998 | Uchikawa et al. |
| 6,632,116 B2 * | 10/2003 | Watanabe et al. ............ 445/24 |
| 6,853,137 B2 * | 2/2005 | Asano et al. ................ 313/586 |
| 2002/0163108 A1 | 11/2002 | Inoue et al. |

FOREIGN PATENT DOCUMENTS

| EP | 0 855 731 A1 | | 7/1998 |
| EP | 1460670 | * | 9/2004 |
| JP | 362180932 A | * | 9/1987 |
| JP | 2001-202876 A | | 7/2001 |
| JP | 2001-202877 A | | 7/2001 |

OTHER PUBLICATIONS

Patent Abstracts of Japan, vol. 2000, No. 16, May 8, 2001 & JP 2001-006536 A (Pioneer Electronic Corp), Jan. 12, 2001.
Patent Abstracts of Japan, vol. 1998, No. 2, Jan. 30, 1998 & JP 9 283018 A (Dainippon Printing Co Ltd.), Oct. 31, 1997.
Patent Abstracts of Japan, vol. 2000, No. 03, Mar. 30, 2000, & JP 11 338129 A (Fujifilm Olin Co Ltd.), Dec. 10, 1999.
Patent Abstracts of Japan, vol. 1998, No. 6, Apr. 30, 1998 & JP 10 055758 A (Dainippon Printing Co Ltd.), Feb. 24, 1998.

* cited by examiner

*Primary Examiner*—Nguyen T Ha
(74) *Attorney, Agent, or Firm*—Darby & Darby P.C.

(57) ABSTRACT

A composition for a dielectric of a plasma display panel laminating a plurality of layers, includes: a lower layer composition containing inorganic powder and a binder resin, an upper layer composition containing inorganic powder, a binder resin, a photopolymerizable monomer and a photopolymerization initiator, the upper layer composition being provided above the lower layer, and an intermediate layer composition containing a thermally decomposable resin, the intermediate layer composition being provided between the lower layer and the upper layer.

5 Claims, No Drawings

COMPOSITION FOR DIELECTRIC OF PLASMA DISPLAY PANEL, LAMINATE FOR DIELECTRIC, AND METHOD FOR FORMING THE DIELECTRIC

CROSS-REFERENCE TO PRIOR APPLICATION

This is a U.S. national phase application under 35 U.S.C. §371 of International Patent Application No. PCT/JP2004/006998 filed May 17, 2004, and claims the benefit of Japanese Patent Application No. 2003-150966 filed May 28, 2003 which is incorporated by reference herein. The International Application was published in English on Dec. 9, 2004 as WO 2004/107049 A1 under PCT Article 2 1(2).

TECHNICAL FIELD

The present invention relates to a composition for a dielectric for forming the dielectric of a plasma display panel, a laminate for the dielectric, and a method of forming the dielectric.

BACKGROUND ART

A plasma display panel (hereinafter abbreviated as PDP) is configured by forming a dielectric made up of a phosphor, electrodes and inorganic materials in numbers of microspaces formed by two glass substrates and barrier ribs provided between the substrates and injecting a discharge gas thereto. In PDP, each microspace is one pixel, when a voltage is applied to electrodes, a discharge is started through the dielectrics, thereby a discharge gas is excited and phosphors are illuminated by ultraviolet ray emitted when the discharge gas returns to a ground state. Such PDPs are more suitable for large size displays compared to conventional liquid crystal display devices and CRT displays, and have been put into practical use.

As a specific structure of microspaces, conventionally a stripe type where numbers of parallel slots are aligned has been frequently employed. In this stripe type, the phosphor is formed on three faces which are a bottom and two side faces facing thereto in the slot, and the discharge gas in introduced from both ends of the slot. However, luminescence luminance has been limited in this structure.

Thus, recently, a cell type where barriers are provided in each slot in the stripe type has been developed. In this cell type, the phosphor is applied on total five faces which are a bottom face and four side faces surrounding the bottom face in each cell and a surface area of the phosphor can be increased. Therefore the luminance can be enhanced.

However, in the case of the cell type, there has been problem that it is difficult to assure an introduction path of the discharge gas because all four sides are covered with barrier ribs. Thus, a technology where columns are installed on the barrier ribs which surround each cell and the gas is introduced through slits formed by the columns has been developed (e.g., see JP 2001-202876A and JP 2001-202877A).

However, in this case, a fabrication method is a method which requires many steps, where the respective barrier ribs in a vertical and horizontal directions, which are formed to be orthogonal each other are formed via a patterning step utilizing photoresist and sandblast, and thus there has been problem that working efficiency is poor.

As described above, in PDP, particularly the cell type PDP, there has been problem that it is difficult to easily assure the path for the introduction of discharge gas.

The problem of the invention is to form an introduction path of the discharge gas relatively simply compared to conventional ones and enhance the working efficiency for the steps of fabricating a plasma display panel.

DISCLOSURE OF INVENTION

In order to solve the above problems, in accordance with a first aspect of the invention, a composition for a dielectric of a plasma display panel laminating a plurality of layers comprises:

a lower layer composition containing inorganic powder and a binder resin, an upper layer composition containing inorganic powder, a binder resin, a photopolymerizable monomer and a photopolymerization initiator, the upper layer composition being provided above the lower layer, and an intermediate layer composition containing a thermally decomposable resin, the intermediate layer being provided between the lower layer and the upper layer.

According to the first aspect of the invention, the composition comprises an intermediate layer composition containing a thermally decomposable resin between a lower layer containing inorganic powder and a binder resin and an upper layer composition containing inorganic powder, a binder resin, a photopolymerizable monomer and a photopolymerization initiator.

When forming a dielectric, first, in a state where a laminate for the dielectric is made by overlaying the composition of each layer, a pattern is formed into a desired shape by selectively irradiating light having a predetermined wavelength to the upper layer through a photo mask and the like and giving a development treatment to the upper layer. Next, by firing, the lower layer and the upper layer independently lose organic contents to shrink as well as the intermediate layer is thermally degraded, and subsequently an entirety is integrated to form the dielectric. When there is no intermediate layer, the lower layer and the upper layer are integrated, and subsequently lose the organic contents to shrink. Thus there is a possibility that shrinkage occurs in an uneven thickness state and cracks occur along patterns. However, by providing the intermediate layer containing the thermally decomposable resin, the lower layer and the upper layer lose the organic contents to shrink during the intermediate layer being thermally degraded, and subsequently the lower layer and the upper layer are integrated. Therefore, it is possible to prevent cracks which occur by shrinking in the uneven thickness state and obtain a good firing pattern.

When fabricating PDP, paths through which the discharge gas is introduced from concave sections of the dielectric to each cell can be assured by adapting concavoconvex sections of the dielectric derived from the upper layer to the barrier ribs. As described above, the gas introduction paths can be simply formed by collectively firing the respective layers to form the dielectric, and it is possible to enhance the working efficiency of the fabrication step of plasma display panels and shorten a tact time per panel.

It is preferred that a remaining amount is 50% or less when the thermally decomposable resin is heated to 600° C. at 5° C./min and treated with heat at 600° C. for 20 min.

According to the composition for the dielectric, in addition to obtaining the similar effect to that in the first aspect, since the thermally decomposable resin takes a long time to degrade at the treatment with heat, in the meantime, the lower layer and the upper layer lose the organic contents to shrink, and subsequently the lower layer and the upper layer are integrated. Thus, it is possible to prevent cracks which occur by shrinking in the uneven thickness state and obtain a better firing pattern.

It is preferred that the thermally decomposable resin is a resin different from the binder resin.

According to the composition for the dielectric, the similar effect to that in the first aspect is obtained, and additionally, since the thermally decomposable resin is the different resin from the binder resin, it is possible to prevent the resins of the lower layer and the upper layer from penetrating into the intermediate layer when the intermediate layer is laminated between the lower layer and the upper layer, and more certainly prevent the cracks at the firing.

It is preferred that the thermally decomposable resin is water-soluble and the binder resin in the lower layer is hardly soluble in water.

According to the composition for the dielectric, in addition to obtaining the above-described effect, since the thermally decomposable resin is water-soluble and the binder resin in the lower layer is hardly soluble in water, the compositions in respective layers are not mixed one another when they are laminated by dissolving in a solvent. Thus it is possible to more certainly prevent the resins in the lower layer and the upper layer from penetrating into the intermediate layer, and more certainly prevent the cracks at the firing. When the patterning is given to the upper layer, the inorganic matters in the upper layer is not present as residues on the lower layer because the intermediate layer is water-soluble.

It is preferred that at least one of the lower layer composition and the intermediate layer composition further contains a light absorbent which absorbs light having a predetermined wavelength.

Here, the light absorbent is one which absorbs the light having wavelength which can be exposed to the upper layer, and materials thereof may be organic or inorganic matters unless they impair properties of the dielectric, and multiple types of light absorbents may be used in mixture.

According to the composition for the dielectric, the similar effect to the above is obtained. The composition for dielectric for forming at least one layer of the lower layer and intermediate layer further contains a light absorbent which absorbs the light having a predetermined wavelength. Therefore, when the light having a predetermined wavelength is selectively irradiated onto the upper layer through a photo mask and the like in a state where the respective layers are overlaid to make a laminate for the dielectric, the light which passes through the upper layer and attains to the layer containing the light absorbent is absorbed by the light absorbent. This can prevent halation where the light which attains to the lower layer is scattered by inorganic powder and the like in the lower layer and subsequently reenters the upper layer from random directions, and form the desired latent image pattern according to the shape of mask.

In accordance with a second aspect of the invention, a laminate for a dielectric of a plasma display panel comprises:

a lower layer containing inorganic powder and a binder resin, an upper layer containing inorganic powder, a binder resin, a photopolymerizable monomer and a photopolymerization initiator, which is provided above the lower layer, and an intermediate layer containing a thermally decomposable resin, provided between the lower layer and the upper layer, in a composition for a dielectric of a plasma display panel laminating a plurality of layers.

According to the laminate for the dielectric, similarly to the first aspect, the lower layer and the upper layer independently lose the organic contents to shrink as well as the intermediate layer is thermally degraded, and subsequently the entirety is integrated to form the dielectric. Therefore, it is possible to prevent the crack due to shrinkage in the uneven thickness state.

As with the first aspect, it is possible to easily form the gas introduction paths, enhance the working efficiency in the fabrication steps of plasma display panels and shorten the tact time per panel.

It is preferred that a thickness of the intermediate layer is 5 μm or less.

According to the laminate for the dielectric, the similar effect to the above is obtained. There is a possibility that bubbles occur around a contact portion between a pattern forming portion at the upper layer and the intermediate layer due to water and carbon dioxide generated by thermally degrading the intermediate layer at the firing. However, it is possible to make the dielectric without leaving bubbles by making a thickness of the intermediate layer 5 μm or less.

It is preferred that a remaining amount of the thermally decomposable resin is 50% or less when the thermally decomposable resin is heated to 600° C. at 5° C./min and treated with heat at 600° C. for 20 min.

It is preferred that the thermally decomposable resin is a resin different from the binder resin.

It is preferred that the thermally decomposable resin is water-soluble and the binder resin in the lower layer is hardly soluble in water.

It is preferred that at least one of the lower layer composition and the intermediate layer composition further contains a light absorbent which absorbs light having a predetermined wavelength.

In accordance with a third aspect of the invention, a method for forming a dielectric of a plasma display panel laminating a plurality of layers comprises:

forming a lower layer containing inorganic powder and a binder resin, an intermediate layer containing a thermally decomposable resin, and an upper layer containing inorganic powder, a binder resin, a photopolymerizable monomer and a photopolymerization initiator on a glass substrate to laminate the lower layer, the intermediate layer and the upper layer in sequence, then forming a pattern having a predetermined shape by developing after selectively irradiating light to the upper layer, and collectively firing the respective layers.

It is preferred that a thickness of the intermediate layer is 5 μm or less.

It is preferred that a remaining amount is 50% or less when the thermally decomposable resin is heated to 600° C. at 5° C./min and treated with heat at 600° C. for 20 min.

It is preferred that the thermally decomposable resin is a resin different from the binder resin.

It is preferred that the thermally decomposable resin is water-soluble and the binder resin in the lower layer is hardly soluble in water.

It is preferred that at least one of the lower layer composition and the intermediate layer composition further contains a light absorbent which absorbs light having a predetermined wavelength.

According to the invention, by providing an intermediate layer composition containing a thermally decomposable resin between a lower layer composition containing inorganic powder and a binder resin and an upper layer composition containing inorganic powder, a binder resin, a photopolymerizable monomer and a photopolymerization initiator, the lower layer and the upper layer lose organic contents to shrink during the intermediate layer being thermally degraded, and subsequently the lower layer and the upper layer are integrated. Therefore, it is possible to prevent cracks which occur due to the shrinkage in an uneven thickness state and obtain a good firing pattern.

And when a pattern is formed with the desired shape on the upper layer and subsequently all organic contents are eliminated by firing to yield a dielectric, a concavoconvex pattern derived from the upper layer is formed on the surface thereof. When fabricating the PDP, it is possible to assure paths to introduce a discharge gas to each cell from a concave parts of the dielectric by adapting a concavoconvex face of the dielectric derived from the upper layer to a barrier rib. As described above, it is possible to simply form the gas introduction paths by collectively firing the respective layers to form the dielectric, therefore, enhance the working efficiency of the fabrication steps of plasma display panels and shorten the tact time per panel.

BEST MODE FOR CARRYING OUT OF THE INVENTION

Hereinafter, the invention is illustrated in detail.

The laminate for the dielectric according to the invention is configured by providing an intermediate layer where a thermally decomposable resin is an essential ingredient between a lower layer where inorganic powder and a binder resin are essential ingredients and an upper layer where a photopolymerizable monomer and a photopolymerization initiator in addition to inorganic powder and a binder resin are essential ingredients. Additionally, the lower layer may contain a light absorbent which absorbs the light having a predetermined wavelength.

Typically, it is possible to form the layers of the dielectric which configures the PDP by mixing these with solvents and the like, respectively to prepare liquid or paste compositions for the dielectric, and directly applying these compositions in sequence on a glass substrate or making films from the compositions and laminating the film in sequence on the glass substrate.

The inorganic powder contained in the lower layer and the upper layer is preferably one which is vitrescible by firing, and for example, includes $PbO$—$SiO_2$, $PbO$—$B_2O_3$—$SiO_2$, $ZnO$—$SiO_2$, $ZnO$—$B_2O_3$—$SiO_2$, $BiO$—$SiO_2$, $BiO$—$B_2O_3$—$SiO_2$, $PbO$—$B_2O_3$—$SiO_2$—$Al_2O_3$, and $PbO$—$ZnO$—$B_2O_3$—$SiO_2$ systems, and the like.

As the binder resins contained in the lower layer and the upper layer, it is possible to use those obtained by polymerizing or copolymerizing monomers included below. These monomers can be mixed as photopolymerizable monomers in the lower layer and the upper layer.

As such monomers, for example, it is possible to suitably use (meth)acrylate ester, ethylenic unsaturated carboxylic acid and the other copolymerizable monomers, and include benzyl acrylate, benzyl methacrylate, cyclohexyl acrylate, cyclohexyl methacrylate, phenoxyethyl acrylate, phenoxyethyl methacrylate, phenoxypolyethyleneglycol acrylate, phenoxypolyethyleneglycol methacrylate, styrene, nonylphenoxypolyethyleneglycol monoacrylate, nonylphenoxypolyethyleneglycol monomethacrylate, nonylphenoxypolypropylene monoacrylate, nonylphenoxypolypropylene monomethacrylate, 2-hydroxy-3-phenoxypropyl acrylate, 2-acryloyloxyethyl phthalate, 2-acryloyloxyethyl-2-hydroxyethyl phthalate, 2-methacryloyloxyethyl-2-hydroxypropyl phthalate, methyl acrylate, ethyl acrylate, methyl methacrylate, ethyl methacrylate, n-propyl acrylate, n-propyl methacrylate, i-propyl acrylate, i-propyl methacrylate, n-butyl acrylate, n-butyl methacrylate, i-butyl acrylate, i-butyl methacrylate, sec-butyl acrylate, sec-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, 3-ethylhexyl acrylate, ethyleneglycol monoacrylate, ethyleneglycol monomethacrylate, glycerol acrylate, glycerol methacrylate, dipentaerythritol monoacrylate, dipentaerythritol monomethacrylate, dimethylaminoethyl acrylate, dimethylaminoethyl methacrylate, tetrahydrofurfuryl acrylate, tetrahydrofurfuryl methacrylate, acrylic acid, methacrylic acid, crotonic acid, cinnamic acid, maleic acid, maleic anhydride, fumaric acid, itaconic acid, itaconic anhydride, citraconic acid, citraconic anhydride, and the like. Among them, acrylic acid and methacrylic acid are suitably used.

As the other copolymerizable monomers, it is possible to include, for example, fumarate esters, maleate esters, crotonate esters and itaconate esters where the aforementioned example compounds of (meth)acrylate esters are changed to fumarate, maleate, crotonate and itaconate compounds, respectively, o-methylstyrene, o-vinyltoluene, m-vinyltoluene, p-vinyltoluene, o-chlorostyrene, m-chlorostyrene, p-chlorostyrene, o-methoxystyrene, m-methoxystyrene, p-methoxystyrene, vinyl acetate, vinyl butyrate, vinyl propionate, acrylamide, methacrylamide, acrylonitrile, methacrylonitrile, isoprene, chloroprene, 3-butadiene, and the like.

Photopolymerizable monomers contained in the upper layer can include the monomers described above.

As polymerization catalysts at the polymerization to use the above monomer as the binder resin, it is possible to use common radical polymerization initiators, and include, for example, azo compounds such as 2-2'-azobisisobutyronitrile, 2,2'-azobis-(2,4-dimethylvaleronitrile and 2,2'-azobis-(4-methoxy-2-dimethylvaleronitrile), organic peroxides such as benzoyl peroxide, lauroyl peroxide, tert-butyl peroxypivalate and 1,1'-bis-(tert-butylperoxy)cyclohexane, and hydrogen peroxide, and the like. When the peroxide is used as the radical polymerization initiator, it may be made into a redox type initiator by combining a reducing agent.

In addition to the polymers and copolymers of the above monomers, as the binder resins, it is possible to use cellulose derivatives such as hydroxyethylcellulose, hydroxypropylcellulose, carboxymethylcellulose, carboxyethylcellulose and carboxyethylmethylcellulose, and further copolymers of these cellulose derivatives with ethylenic unsaturated carboxylic acid and (meth)acrylate compounds.

Additionally, the binder resins include polyvinyl alcohols such as polybutyral resin which is a reaction product of polyvinyl alcohol with butylaldehyde, polyesters such as δ-valerolactone, ∈-caprolactone, β-propiolactone, α-methyl-β-propiolactone, β-methyl-β-propiolactone, α,α-dimethyl-β-propiolactone and β,β-dimethyl-β-propiolactone where lactones are polymerized with ring-opening, polyesters obtained by a condensation reaction of alkylene glycol alone such as ethyleneglycol, propyleneglycol, diethyleneglycol, triethyleneglycol, dipropyleneglycol and neopentylglycol or two or more of diols with dicarboxylic acid such as maleic acid, fumaric acid, glutaric acid and adipic acid, polyethers such as polyethyleneglycol, polypropyleneglycol, polytetramethyleneglycol and polypentamethyleneglycol, polycarbonates which are reaction products of diols such as bisphenol A, hydroquinone and dihydroxycyclohexane with carbonyl compounds such as diphenylcarbonate, phosgene and succinic acid anhydride.

The above binder resins can be used alone or in mixture with two or more. It is preferred that the binder resin in the lower layer is hardly soluble in water when the thermally decomposable resin described below is water-soluble.

Here, when the compositions for the dielectric in the lower layer and the upper layer are prepared into liquid or paste, an organic solvent can be used as a solvent. The organic solvents include, for example, alcohols such as methanol, ethanol, ethyleneglycol, diethyleneglycol, propyleneglycol and 3-methoxy-3-methylbutanol, cyclic ethers such as tetrahydrofuran and dioxane, alkyl ethers of polyvalent alcohol such as ethyleneglycol monomethylether, ethyleneglycol monoethylether, ethyleneglycol dimethylether, ethyleneglycol diethylether, diethyleneglycol monomethylether, diethyleneglycol monoethylether, diethyleneglycol dimethylether, diethyleneglycol diethylether, diethyleneglycol ethylmethylether, propyleneglycol monomethylether and propyleneglycol monoethylether, alkoxyalkyl acetates such as 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate and 4-ethoxybutyl acetate, alkylether acetates of polyvalent alcohol such as ethyleneglycol ethylether acetate, diethyleneglycol ethylether acetate, propyleneglycol ethylether acetate and propyleneglycol monomethylether acetate, aromatic hydrocarbons such as toluene and xylene, ketones such as acetone, methylethylketone, methylisobutylketone, cyclohexane, 4-hydroxy-4-methyl-2-pentanone and diacetone alcohol, and esters such as ethyl acetate, butyl acetate, ethyl 2-hydroxypropionate, methyl 2-hydroxy-2-methylpropionate, ethyl 2-hydroxy-2-methylpropionate, ethyl ethoxyacetate ethyl hydroxyacetate, methyl 2-hydroxy-3-methylbutanoate, methyl 3-methoxypropionate, ethyl 3-methoxypropionate, ethyl 3-ethoxypropionate and methyl 3-ethoxypropionate. Among them, cyclic ethers, alkylethers of polyvalent alcohol, alkylether acetates of polyvalent alcohol, ketones, esters and the like are preferable.

These solvents are used to dissolve or uniformly disperse the composition for the dielectric of the lower layer or the upper layer. If the composition contains a liquid component which functions as the solvent in the composition for the dielectric and is dissolved or uniformly dispersed as it is without newly adding a solvent, no solvent may be used.

As the thermally decomposable resin which becomes a major ingredient of the intermediate layer installed between the lower layer and the upper layer, resins where a residual amount is 50% or less when a temperature is raised to 600° C. at 5° C./min and the resin is treated at 600° C. for 20 min at the treatment with heat are preferable.

Specifically, it is possible to use those obtained by polymerizing or copolymerizing monomers included below, and it is preferable to use a different resin from the binder resins used for the lower layer and the upper layer.

As these monomers, for example, it is possible to use (meth)acrylate ester, ethylenic unsaturated carboxylic acid and the other copolymerizable monomers, and include benzyl acrylate, benzyl methacrylate, cyclohexyl acrylate, cyclohexyl methacrylate, phenoxyethyl acrylate, phenoxyethyl methacrylate, phenoxypolyethyleneglycol acrylate, phenoxypolyethyleneglycol methacrylate, styrene, nonylphenoxypolyethyleneglycol monoacrylate, nonylphenoxypolyethyleneglycol monomethacrylate, nonylphenoxypolypropylene monoacrylate, nonylphenoxypolypropylene monomethacrylate, 2-hydroxy-3-phenoxypropyl acrylate, 2-acryloyloxyethyl phthalate, 2-acryloyloxyethyl-2-hydroxyethyl phthalate, 2-methacryloyloxyethyl-2-hydroxypropyl phthalate, methyl acrylate, ethyl acrylate, methyl methacrylate, ethyl methacrylate, n-propyl acrylate, n-propyl methacrylate, i-propyl acrylate, i-propyl methacrylate, n-butyl acrylate, n-butyl methacrylate, i-butyl acrylate, i-butyl methacrylate, sec-butyl acrylate, sec-butyl methacrylate, tert-butyl acrylate, tert-butyl methacrylate, 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, 2-hydroxybutyl acrylate, 2-hydroxybutyl methacrylate, 3-hydroxybutyl acrylate, 3-hydroxybutyl methacrylate, 4-hydroxybutyl acrylate, 4-hydroxybutyl methacrylate, 3-ethylhexyl acrylate, ethyleneglycol monoacrylate, ethyleneglycol monomethacrylate, glycerol acrylate, glycerol methacrylate, dipentaerythritol monoacrylate, dipentaerythritol monomethacrylate, dimethylaminoethyl acrylate, dimethylaminoethyl methacrylate, tetrahydrofurfuryl acrylate, tetrahydrofurfuryl methacrylate, acrylic acid, methacrylic acid, crotonic acid, cinnamic acid, maleic acid, maleic anhydride, fumaric acid, itaconic acid, itaconic anhydride, citraconic acid, citraconic anhydride, and the like.

As the other copolymerizable monomers, it is possible to include, for example, fumarate esters, maleate esters, crotonate esters and itaconate esters where the aforementioned example compounds of (meth)acrylate esters are changed to fumarate, maleate, crotonate and itaconate compounds, respectively, o-methylstyrene, o-vinyltoluene, m-vinyltoluene, p-vinyltoluene, o-chlorostyrene, m-chlorostyrene, p-chlorostyrene, o-methoxystyrene, m-methoxystyrene, p-methoxystyrene, vinyl acetate, vinyl butyrate, vinyl propionate, acrylamide, methacrylamide, acrylonitrile, methacrylonitrile, isoprene, chloroprene, 3-butadiene, and the like.

In addition to polymers and copolymers of the above monomers, as the thermally decomposable resins, it is possible to use cellulose derivatives such as cellulose, hydroxymethylcellulose, hydroxyethylcellulose, hydroxypropylcellulose, carboxymethylcellulose, carboxyethylcellulose and carboxyethylmethylcellulose, and further copolymers of these cellulose derivatives with ethylenic unsaturated carboxylic acid and (meth)acrylate compounds.

Additionally, the thermally decomposable resins include polyvinyl alcohols such as polybutyral resin which is a reaction product of polyvinyl alcohol with butylaldehyde, polyesters such as δ-valerolactone, ∈-caprolactone, β-propiolactone, α-methyl-β-propiolactone, β-methyl-β-propiolactone, α,α-dimethyl-β-propiolactone and β,β-dimethyl-β-propiolactone where lactones are polymerized with ring-opening, polyesters obtained by a condensation reaction of alkylene glycol alone such as ethyleneglycol, propyleneglycol, diethyleneglycol, triethyleneglycol, dipropyleneglycol and neopentylglycol or two or more of diols with dicarboxylic acid such as maleic acid, fumaric acid, glutaric acid and adipic acid, polyethers such as polyethyleneglycol, polypropyleneglycol, polytetramethyleneglycol and polypentamethyleneglycol, and polycarbonates which are reaction products of diols such as bisphenol A, hydroquinone and dihydroxycyclohexane with carbonyl compounds such as diphenylcarbonate, phosgene and succinic anhydride.

In the above thermally decomposable resins, particularly, water-soluble resins are preferable, and resins with solvent resistance are preferable. Particularly, polyvinyl alcohol and water-soluble cellulose derivatives are preferable. The above thermally decomposable resins can be used alone or in mixture with two or more.

Here, when the composition for the dielectric of the intermediate layer is prepared into liquid or paste, water or an organic solvent, or a mix solvent of the water and the organic solvent can be used as a solvent. The organic solvents include, for example, alcohols such as methanol, ethanol, ethyleneglycol, diethyleneglycol, propyleneglycol and 3-methoxy-3-methylbutanol, cyclic ethers such as tetrahydrofuran and dioxane, alkyl ethers of polyvalent alcohol such as ethyleneglycol monomethylether, ethyleneglycol monoethylether, ethyleneglycol dimethylether, ethyleneglycol diethylether, diethyleneglycol monomethylether, diethyleneglycol monoethylether, diethyleneglycol dimethylether, diethyleneglycol diethylether, diethyleneglycol ethylmethylether, propyleneglycol monomethylether and propyleneglycol monoethylether, alkoxyalkyl acetates such as 2-methoxybutyl acetate, 3-methoxybutyl acetate, 4-methoxybutyl acetate, 2-methyl-3-methoxybutyl acetate, 3-methyl-3-methoxybutyl acetate, 3-ethyl-3-methoxybutyl acetate, 2-ethoxybutyl acetate and 4-ethoxybutyl acetate, alkylether acetates of polyvalent alcohol such as ethyleneglycol ethylether acetate, diethyleneglycol ethylether acetate, propyleneglycol ethylether acetate and propyleneglycol monomethylether acetate, ketones such as acetone, methylethylketone, methylisobutylketone, cyclohexane, 4-hydroxy-4-methyl-2-pentanone and diacetone alcohol, and esters such as ethyl acetate, butyl acetate, ethyl 2-hydroxypropionate, methyl 2-hydroxy-2-methylpropionate, ethyl 2-hydroxy-2-methylpropionate, ethyl ethoxyacetate ethyl hydroxyacetate, methyl 2-hydroxy-3-methylbutanoate, methyl 3-methoxypropionate, ethyl 3-methoxypropionate, ethyl 3-ethoxypropionate and methyl 3-ethoxypropionate. Among them, it is preferable to use the mix solvent of water and alcohol.

These solvents are used to dissolve or uniformly disperse the composition for the dielectric of the intermediate layer. If the composition comprises a liquid component which functions as the solvent in the composition for the dielectric and is dissolved or uniformly dispersed as it is without newly adding a solvent, no solvent may be used.

The lower layer or the intermediate layer may contain a light absorbent capable of absorbing light having a wavelength which is exposed to the upper layer, i.e., photoactivates a photopolymerization initiator contained in the upper layer.

As such a light absorbent, those which absorb the light having a wavelength of 300 to 450 nm are suitably used, and for example, azo type dyes, aminoketone type dyes, xanthene type dyes, quinoline dyes, benzophenone type dyes, triazine type dyes, benzotriazole type dyes, and anthraquinone type dyes are included.

It is preferred that the light absorbent is mixed at 0.01 to 30 parts by weight based on total 100 parts by weight of the inorganic powder, the binder resin and the light absorbent in the composition for forming the lower layer. It is also preferred that the light absorbent is mixed at 0.01 to 30 parts by weight based on total 100 parts by weight of the thermally decomposable resin and the light absorbent in the composition for forming the intermediate layer.

When it is less than 0.01 part by weight, sufficient light absorption effect can not be exerted. When it is more than 30 parts by weight, the upper layer around an interface is not sufficiently exposed due to excess absorption of the light. Thus, a film is sometimes peeled off and the pattern can not be sometimes formed.

The photopolymerization initiator contained as the essential ingredient in the upper layer includes 1-hydroxycyclohexyl phenylketone, 2,2-dimethoxy-1,2-diphenylethane-1-one, 2-methyl-1-[4-(methylthio)phenyl]-2-morpholinopropane-1-one, 2-benzyl-2-dimethylamino-1-(4-morpholinophenyl)-butane-1-one, 2-hydroxy-2-methyl-1-phenylpropane-1-one, 2,4,6-trimethylbenzoyldiphenylphosphine oxide, 1-[4-(2-hydroxyethoxy)phenyl]-2-hydroxy-2-methyl-1-peopane-1-one, 2,4-diethylthioxanthone, 2-chlorothioxanthone, 2,4-dimethylthioxanthone, 3,3-dimethyl-4-methoxybenzophenone, benzophenone, 1-chloro-4-propoxythioxanthone, 1-(4-isopropylphenyl)-2-hydroxy-2-methylpropane-1-one, 1-(4-dodecylphenyl)-2-hydroxy-2-methylpropane-1-one, 4-benzoyl-4'-methyldimethyl sulfide, 4-dimethylaminobenzoic acid, methyl 4-dimethylaminobenzoate, ethyl 4-dimethylaminobenzoate, butyl 4-dimethylaminobenzoate, 4-dimethylaminobenzoate-2-ethylhexyl, 4-dimethylaminobenzoate-2-isoamyl, 2,2-diethoxyacetophenone, 2,2-dimethoxy-2-phenylacetophenone, benzyldimethylketal, benzyl-β-methoxyethylacetal, 1-phenyl-1,2-propanedione-2-(o-ethoxycarbonyl)oxime, methyl o-benzoylbenzoate, bis (4-dimethylaminophenyl)ketone, 4,4'-bisdiethylaminobenzophenone, 4,4'-dichlorobenzophenone, benzyl, benzoin, benzoin methylether, benzoin ethylether, benzoin isopropylether, benzoin n-butylether, benzoin isobutylether, p-dimethylaminoacetophenone, p-tert-butyltrichloroacetophenone, p-tert-butyldichloroacetophenone, thioxanthone, 2-methylthioxanthone, 2-isopropylthioxanthone, dibenzosuberone, α,α-dichloro-4-phenoxyacetophenone, pentyl-4-dimethylaminobenzoate, 9-phenylacridine, 1,7-bis-(9-acridinyl)heptane, 1,5-bis-(9-acridinyl)pentane, 1,3-bis-(9-acridinyl)propane, and the like. These photopolymerization initiators may be used alone or in combination with two or more.

The upper layer comprises the photopolymerizable monomer and the photopolymerization initiator as essential ingredients. Therefore, finally the dielectric having a concavoconvex pattern derived from a pattern on the upper layer can be formed by forming the intermediate layer on the lower layer, forming the upper layer on the intermediate layer and subsequently giving patterning only to the upper layer. And as described below, "slits" are produced at the upper part of each cell by putting a convex part on a barrier rib part, and thus a discharge gas can be introduced.

The patterning may be also given to the lower layer. For example, the predetermined pattern may be formed at marginal parts of the lower layer in conformity with an outer shape of the glass substrate which composes the PDP. When the lower layer further contains the photopolymerizable monomer and the photopolymerization initiator, nearly entire faces of the lower layer could be exposed before the exposure and development of the upper layer. When the patterning is also given to the lower layer, it is possible to prevent the upper layer from being exposed at the exposure of the lower layer by containing the light absorbent in the intermediate layer.

As described above, when the lower layer or the intermediate layer contains the light absorbent capable of absorbing the light with the wavelength which photoactivates the photopolymerization initiator contained in the upper layer, it is possible to prevent the light which enters the layer containing the light absorbent from being scattered by inorganic powder and the like inside the lower layer when the upper layer is patterned into the given shape by exposing in a state where the respective layers are laminated.

Thus, if the light absorbent is not contained, the light is scattered by particles of the inorganic powder and the like in the lower layer. Therefore, the upper layer is exposed by the light which enters in undefined directions from the lower layer, and consequently an accurate pattern formation according to the mask becomes impossible. To prevent it, the lower layer is fired to make a transparent glass state, and subsequently the intermediate layer is formed, exposed and again fired, i.e., the firing must be performed twice.

However, in the invention, at least one layer of the lower layer or the intermediate layer contains the light absorber, and thus, the firing can be performed at a time and the desired pattern can be formed.

In the invention, to obtain a laminate for the dielectric, a liquid or paste composition for the dielectric for the lower layer (hereinafter, referred to as a lower layer composition) where the above solvent, binder resin and inorganic powder as the essential ingredients and if necessary, the light absorbent, photopolymerizable monomer and photopolymerization initiator are mixed is prepared.

For the intermediate layer, a liquid or paste composition for the dielectric (hereinafter, referred to as an intermediate layer composition) where the above solvent and thermally decomposable resin as the essential ingredients and if necessary, the light absorbent are mixed is prepared.

For the upper layer, a liquid or paste composition (hereinafter, referred to as an upper layer composition) where the above solvent, binder resin, inorganic powder, photopolymerizable monomer and photopolymerization initiator as the essential ingredients are mixed is prepared.

Additionally, various additives such as a dispersant, tackifier, plasticizer, surface tension adjuster, stabilizer and defoaming agent may be added as optional ingredients to the compositions of respective layers.

In the lower layer composition and the upper layer composition, a ratio of the inorganic powder could be from 100 to 1000 parts by weight based on 100 parts by weight of all of the other organic components (including the organic solvent, binder resin, photopolymerizable monomer, photopolymerization initiator and the like).

The inorganic powder, binder resins and the other additives included in the lower layer composition and the upper layer composition, respectively may be the same or different materials. Even when they are the same material, the ratios thereof may be different.

It is preferred that the thermally decomposable resin included in the intermediate layer is different from both binder resins used for the lower layer composition and the upper layer composition.

The laminate for the dielectric according to the invention is fabricated by, for example, the methods 1 to 12 described below.

(1). The solvents are eliminated from the lower layer composition, the intermediate layer and the upper layer composition, respectively, which are made into films. The films are laminated to make two layer film and one layer film or three layer film, which are subsequently anchored to the glass substrate which composes the PDP. Or those made into films are sequentially laminated onto the glass substrate.

(2). The solvent is precedently eliminated from the intermediate layer composition to make a film, the lower (upper) layer composition is applied onto the surface thereof, and the solvent is eliminated to make a two layer film. Separately, the solvent is eliminated from the upper (lower) layer composition to form a film. Next both are sequentially anchored to the glass substrate which composes the PDP.

(3). The solvent is precedently eliminated from the lower (upper) layer composition to make a film, the intermediate layer composition is applied onto the surface thereof, and the solvent is eliminated to make a two layer film. Separately, the solvent is eliminated from the upper (lower) layer composition to form a film. Next both are sequentially anchored to the glass substrate which composes the PDP.

(4). The solvent is precedently eliminated from the intermediate layer composition to make a film, lower (upper) layer composition is applied onto the surface thereof, and the solvent is eliminated to make a two layer film. Separately, the solvent is eliminated from the upper (lower) layer composition to form a film. Next, both are coupled to obtain a three layer laminate, which is subsequently anchored to the glass substrate which composes the PDP.

(5). The solvent is precedently eliminated from the lower (upper) layer composition to make a film, the intermediate layer composition is applied onto the surface thereof, and the solvent is eliminated to make a two layer film. Separately, the solvent is eliminated from the upper (lower) layer composition to form a film. Next, both are coupled to obtain a three layer laminate, which is subsequently anchored to the glass substrate which composes the PDP.

(6). The solvent is precedently eliminated from the lower (upper) layer composition to make a film, the intermediate layer composition is applied onto the surface thereof, and the solvent is eliminated to make a film, the upper (lower) layer composition is applied onto the surface thereof, and the solvent is eliminated to make a film, resulting in forming a three layer laminate. Subsequently, it is anchored to the glass substrate which composes the PDP.

(7). A laminate is obtained by applying the lower layer composition on the glass substrate which composes the PDP, eliminating the solvent to form a lower layer, subsequently, applying the intermediate layer composition on the lower layer, eliminating the solvent to form an intermediate layer, then applying the upper layer composition on the intermediate layer, and eliminating the solvent to form an upper layer.

(8). A laminate is obtained by precedently eliminating the solvent from the intermediate (upper) layer composition to make a film, applying the upper (intermediate) layer composition on the surface thereof, eliminating the solvent to form a two layer film composed of the intermediate layer and the upper layer, then applying the lower layer composition on the glass substrate which composes the PDP, eliminating the solvent to form the lower layer, and next laminating the above two layer film.

(9). A laminate is obtained by precedently eliminating the solvent from the intermediate layer composition and the upper layer composition to make films, then applying the lower layer composition on the glass substrate which composes the PDP, eliminating the solvent to form a lower layer, and next sequentially laminating the above two respective films.

(10). A laminate is obtained by precedently eliminating the solvent from the intermediate layer composition and the upper layer composition to form a two layer film composed of the intermediate layer and the upper layer, then applying the lower layer composition on the glass substrate which composes the PDP, eliminating the solvent to form a lower layer, and then laminating the above two layer film.

(11). A laminate is obtained by applying the lower layer composition on the glass substrate which composes the PDP, eliminating the solvent to form a lower layer, laminating thereon one where the solvent is eliminated from the intermediate layer to make a film, subsequently applying the upper layer composition on an intermediate layer, and eliminating the solvent to form an upper layer.

(12). A laminate is obtained by applying the lower layer composition on the glass substrate which composes the PDP, eliminating the solvent to form a lower layer, subsequently applying the intermediate layer composition on the lower layer, eliminating the solvent to form an intermediate layer, and laminating thereon one where the solvent is eliminated from the upper layer composition to make a film.

That is, the laminate for the dielectric of the invention may be one formed by directly laminating on the glass substrate or one precedently formed into a laminated state before being provided on the glass substrate.

It is preferred that a thickness of the intermediate layer before the firing is 5 μm or less. There is a possibility that bubbles occur around a contact portion between the intermediate layer and a pattern forming portion of the upper layer due to water and carbon dioxide generated by thermally degrading the intermediate layer at the firing. However, when the thickness of the intermediate layer is 5 μm or less, no bubble remains.

It is preferred that the thickness of the lower layer is from 5 to 40 μm and that of the upper layer is from 5 to 50 μm, which are derived from the laminate for the dielectric after the firing.

Before providing on the glass substrate, when the lower, intermediate and upper layers are separately made into films, when the lower and intermediate layers or the intermediate and upper layers are made into a two layered laminated film, or when made into a three layered laminated film, it is preferred that the film is formed on a support film or covered with a protective film for convenience of easiness of film fabrication, handling, or convenience at storage.

Resins usable as the support film and the protective film can include polyethylene terephthalate, polyester, polyethylene, polypropylene, polystyrene, polyimide, polyvinyl alcohol, polyvinyl chloride, fluorine-containing resins such as polyfluoroethylene, nylon, cellulose, and the like. For improving mold release property, mold release treatment such as Si treatment may be performed. A thickness of the support film is, for example, from 15 to 100 μm, and a thickness of the protective film is, for example, from 15 to 60 μm.

As described above, it has been described that the photopolymerizable monomer and the photopolymerization initiator may be mixed in the lower layer if necessary. When the photopolymerization is performed to cure before and after installing on the glass substrate after making into a film, adhesive force is reduced and the support film and the protective film are easily peeled off. Furthermore, a shrinking rate at the firing can be uniformized by containing the same photopolymerizable monomer and the photopolymerization initiator as those in the upper layer.

After providing the laminate for the dielectric on the glass substrate, the upper layer is exposed by the light having a predetermined wavelength through a mask having a predetermined shape. Subsequently, a predetermined pattern is formed by eliminating unexposed parts by a developer made up of a solvent or water, an alkali aqueous solution, or the like. Subsequently, all of the organic components are fired out at the temperature of 450° C. or more, the inorganic components are vitrificated and the dielectric is formed by collectively firing the lower, intermediate and upper layers. A concavoconvex pattern derived from the pattern at the upper layer is formed on the surface of this dielectric.

As a wavelength of a light source by which the pattern of the upper layer is formed, it is possible to use the light with a wavelength of 300 nm to 450 nm, and specifically g ray (436 nm), h ray (405 nm) and i ray (365 nm) can be preferably used.

And when the PDP is fabricated, the glass substrate with the dielectric having the concavoconvex pattern (concavoconvex dielectric) is attached to the above cell-type substrate where phosphors and the like are formed inside the barrier ribs. A slit is produced at the side of the dielectric opposite to the phosphor in each cell by aligning a convex part of the dielectric to the barrier rib and aligning a concave part onto the cell, and thus the discharge gas can be introduced into the cell.

The invention is particularly suitably used for the cell-type PDP, but of course may be used for the stripe type PDP.

Next, the present invention is illustrated in more detail based on examples, but the invention is not limited thereto.

EXAMPLE 1

1-1 Preparation of Intermediate Layer Composition

An intermediate layer composition was prepared by mixing 4 parts by weight of polyvinyl alcohol (trade name: PVA-235, supplied from Kuraray Co., Ltd.), 53 parts by weight of water and 43 parts by weight of isopropyl alcohol as solvents for 12 hours in a mixer.

1-2 Fabrication of Intermediate Layer

The resultant intermediate layer composition was applied on a first support film made up of mold release polyethylene terephthalate (trade name: Purex A53 supplied from Teijin DuPont Films Japan Ltd) using a lip coater, and the solvent was completely eliminated by drying a coated film at 100° C. for 6 min to form an intermediate layer with a thickness of 0.5 μm on the first support film.

1-3. Preparation of Lower Layer Composition

A lower layer composition was prepared by kneading 20 parts by weight of isobutyl methacrylate/hydroxyethyl acrylate=80/20 (% by weight) copolymer (Mw=20,000) as an acryl resin and 20 parts by weight of 3-methoxy-3-methylbutanol as a solvent and 80 parts by weight of glass frit.

1-4. Fabrication of Film for Dielectric

The lower layer composition obtained in 1-3. was applied on the intermediate layer formed on the first support film in 1-2. using the lip coater, and the solvent was completely eliminated by drying a coated film at 100° C. for 6 min to form a lower layer with a thickness of 60 μm on the intermediate layer.

Next, mold release polyethylene terephthalate (trade name: Purex A24 supplied from Teijin DuPont Films Japan Ltd) with a thickness of 25 μm as a first protective film was attached on the lower layer to fabricate a film for the dielectric.

1-5. Preparation of Upper Layer Composition

An organic component was prepared by mixing 22 parts by weight of hydroxypropylcellulose as a water-soluble cellulose derivative, 14 parts by weight of styrene/hydroxyethyl methacrylate=55/4.5 (% by weight) copolymer (Mw=40,000) as an acryl resin, 63 parts by weight of 2-methacryloyloxyethyl-2-hydroxypropyl phthalate (trade name: HO-MPP supplied from Kyoeisha Chemical Co., Ltd.) as a photopolymerizable monomer, 0.9 parts by weight of 2,2-dimethoxy-2-phenylacetophenone (trade name: IR-651 supplied from Ciba-Geigy Japan Ltd.) as a photopolymerization initiator, 0.1 parts by weight of an azo dye (trade name: Dye SS supplied from Daito Chemix Corporation) as an ultraviolet ray absorbent, and 100 parts by weight of 3-methoxy-3-methylbutanol as a solvent for 3 hours in a mixer.

The addition of the ultraviolet ray absorbent in the organic component is for preventing halation inside the upper layer and forming a sharp pattern.

An upper layer composition was prepared by kneading 20 parts by weight of the above organic component (solid content: 50%) and 80 parts by weight of glass frit.

1-6. Fabrication of Water Development-Type Photosensitive Film

The upper layer composition obtained in 1-5. was applied on a second support film (trade name: Purex A53 supplied from Teijin DuPont Films Japan Ltd) made up of polyethylene terephthalate using a lip coater, and the solvent was completely eliminated by drying a coated film at 100° C. for 6 min to form a photosensitive glass paste film with a thickness of 40 μm on the second support film. Next, a polyethylene film with a thickness of 25 μm as a second protective film was attached onto the photosensitive glass paste film to fabricate a water development-type photosensitive film.

1-7. Formation of Dielectric Film Layer

The glass substrate where bus electrodes were formed had been precedently heated at 80° C. The film for the dielectric obtained in (4) was laminated on the above glass substrate at 105° C. by a hot roll laminator with peeling the first protective film. An air pressure was 3 kg/cm$^2$, and a laminating speed was 1.0 m/min.

Subsequently, the first support film was peeled off.

1-8. Formation of Water Development-Type Photosensitive Film Layer

The glass substrate on which the dielectric film layer obtained in 1-7. was formed had been precedently heated at 80° C. The water development-type photosensitive film obtained in 1-6. was laminated onto the surface of the intermediate layer on the above glass substrate at ambient temperature using a roll laminator with peeling the second protective film. An air pressure was 3 kg/cm$^2$, and a laminating speed was 1.0 m/min.

1-9. Evaluation

Ultra violet ray was exposed to the water development-type photosensitive film layer by an ultra high pressure mercury lamp at an irradiation quantity of 300 mJ/cm$^2$ through a test pattern mask. Subsequently, after peeling the second support film, a spray development for 30 seconds was performed using water at a liquid temperature of 30° C. at a spray pressure of 3 kg/cm$^2$ to form a pattern. Adhesiveness and a pattern shape of the resultant pattern were evaluated. Consequently, a remaining minimum line width was 60 μm, and the good pattern shape was obtained.

In order to evaluate shape stability of the pattern after the firing, the pattern was formed by the above methods and the firing treatment where the temperature was raised at a rising speed of 1.0° C./min and retained at 580° C. for 30 min was given. Consequently, the good firing pattern was obtained.

EXAMPLE 2

2-1. Preparation of Lower Layer Composition

A lower layer composition was prepared by kneading 20 parts by weight of isobutyl methacrylate/hydroxyethyl acrylate=80/20 (% by weight) copolymer (Mw=20,000) as an acryl resin, 20 parts by weight of 3-methoxy-3-methylbutanol as a solvent and 80 parts by weight of glass frit.

2-2. Formation of Lower Layer

The resultant lower layer composition was applied on a support film made up of mold release polyethylene terephthalate (trade name: Purex A24 supplied from Teijin DuPont Films Japan Ltd) using a lip coater, and the solvent was completely eliminated by drying a coated film at 100° C. for 6 min to form a lower layer with a thickness of 60 μm on the first support film.

2-3. Preparation of Intermediate Layer Composition

An intermediate layer composition was prepared by mixing 4 parts by weight of polyvinyl alcohol (trade name: PVA-235, supplied from Kuraray Co., Ltd.), 53 parts by weight of water and 43 parts by weight of isopropyl alcohol as solvents for 12 hours in a mixer.

2-4. Fabrication of Intermediate Layer

The intermediate layer composition obtained in 2-3. was applied on the lower layer formed on the support film in 2-2., and the solvent was completely eliminated by drying a coated film at 100° C. for 6 min to form an intermediate layer with a thickness of 0.5 μm on the lower layer.

2-5. Preparation of Upper Layer Composition

An organic component was prepared by mixing 22 parts by weight of hydroxypropylcellulose as a water-soluble cellulose derivative, 14 parts by weight of styrene/hydroxyethyl methacrylate=55/45 (% by weight) copolymer (Mw=40,000) as an acryl resin, 63 parts by weight of 2-methacryloyloxyethyl-2-hydroxypropyl phthalate (trade name: HO-MPP supplied from Kyoeisha Chemical Co., Ltd.) as a photopolymerizable monomer, 0.9 parts by weight of 2,2-dimethoxy-2-phenylacetophenone (trade name: IR-651 supplied from Ciba-Geigy Japan Ltd.) as a photopolymerization initiator, 0.1 parts by weight of an azo dye (trade name: Dye SS supplied from Daito Chemix Corporation) as an ultraviolet ray absorbent, and 100 parts by weight of 3-methoxy-3-methylbutanol as a solvent for 3 hours in a mixer.

An upper layer composition was prepared by kneading 20 parts by weight of the above organic component (solid content: 50%) and 80 parts by weight of glass frit.

2-6. Fabrication of Water Development-Type Photosensitive Film

The upper layer composition obtained in 2-5. was applied on the intermediate layer formed on the support film in 2-4. using the lip coater, and the solvent was completely eliminated by drying a coated film at 100° C. for 6 min to form an upper layer with a thickness of 40 μm on the support film. Next, as a protective film, polyethylene terephthalate with a thickness of 25 μm (trade name: Purex A53 supplied from Teijin DuPont Films Japan Ltd) was attached onto the upper layer to fabricate a water development-type photosensitive film with five layer structure.

2-7. Formation of Water Development-Type Photosensitive Film Layer

The glass substrate where bus electrodes were formed had been precedently heated at 80° C. The water development-type photosensitive film obtained in 2-6. was laminated onto the above glass substrate at 105° C. using a hot roll laminator with peeling the mold release polyethylene terephthalate with a thickness (trade name: Purex A24 supplied from Teijin DuPont Films Japan Ltd). An air pressure was 3 kg/cm$^2$, and a laminating speed was 1.0 m/min.

2-8. Evaluation

Ultra violet ray was exposed to the water development-type photosensitive film layer by an ultra high pressure mercury lamp at an irradiation quantity of 300 mJ/cm$^2$ through a test pattern mask. Subsequently, after peeling the support film, a spray development for 30 seconds was performed using water at a liquid temperature of 30° C. at a spray pressure of 3 kg/cm$^2$ to form a pattern. Adhesiveness and a pattern shape of the resultant pattern were evaluated. Consequently, a remaining minimum line width was 60 μm, and the good pattern shape was obtained.

In order to evaluate shape stability of the pattern after the firing, the pattern was formed by the above methods and the firing treatment where the temperature was raised at a rising speed of 1.0° C./min and retained at 580° C. for 30 min was given. Consequently, the good firing pattern was obtained.

COMPARATIVE EXAMPLE 1

3-1. Preparation of Lower Layer Composition

A lower layer composition was prepared by kneading 20 parts by weight of isobutyl methacrylate/hydroxyethyl acrylate=80/20 (% by weight) copolymer (Mw=20,000) as an acryl resin and 20 parts by weight of 3-methoxy-3-methylbutanol as a solvent and 80 parts by weight of glass frit.

3-2. Fabrication of Film for Dielectric

The resultant lower layer composition was applied on a first support film made up of mold release polyethylene terephthalate (trade name: Purex A24 supplied from Teijin DuPont Films Japan Ltd) using a lip coater, and the solvent was completely eliminated by drying a coated film at 100° C. for 6 min to form a lower layer with a thickness of 60 μm on the first support film. Next, as a first protective film, polyethylene film with a thickness of 25 μm was attached onto the lower layer to fabricate a film for the dielectric.

3-3. Preparation of Upper Layer Composition

An organic component was prepared by mixing 22 parts by weight of hydroxypropylcellulose as a water-soluble cellulose derivative, 14 parts by weight of styrene/hydroxyethyl methacrylate=55/45 (% by weight) copolymer (Mw=40,000) as an acryl resin, 63 parts by weight of 2-methacryloyloxyethyl-2-hydroxypropyl phthalate (trade name: HO-MPP supplied from Kyoeisha Chemical Co., Ltd.) as a photopolymerizable monomer, 0.9 parts by weight of 2,2-dimethoxy-2-phenylacetophenone (trade name: IR-651 supplied from Ciba-Geigy Japan Ltd.) as a photopolymerization initiator, 0.1 parts by weight of an azo dye (trade name: Dye SS supplied from Daito Chemix Corporation) as an ultraviolet ray absorbent, and 100 parts by weight of 3-methoxy-3-methylbutanol as a solvent for 3 hours in a mixer.

An upper layer composition was prepared by kneading 20 parts by weight of the above organic component (solid content: 50%) and 80 parts by weight of glass frit.

3-4. Fabrication of Water Development-Type Photosensitive Film

The upper layer composition obtained in 3-3. was applied on a second support film made up of mold release polyethylene terephthalate (trade name: Purex A24 supplied from Teijin DuPont Films Japan Ltd) using the lip coater, and the solvent was completely eliminated by drying a coated film at 100° C. for 6 min to form an upper layer with a thickness of 40 μm on the second support film. Next, as a second protective film, polyethylene film with a thickness of 25 μm was attached onto the upper layer to fabricate a water development-type photosensitive film.

3-5. Formation of Dielectric Film Layer

The glass substrate where bus electrodes were formed had been precedently heated at 80° C. The film for the dielectric obtained in 3-2. was laminated on the above glass substrate at 105° C. by a hot roll laminator with peeling the first protective film. An air pressure was 3 kg/cm$^2$, and a laminating speed was 1.0 m/min.

Subsequently, the first support film was peeled off.

3-6. Formation of Water Development-Type Photosensitive Film Layer

The glass substrate on which the dielectric film layer obtained in 3-5. was formed had been precedently heated at 80° C. The water development-type photosensitive film obtained in 3-4. was laminated onto the surface of the dielectric film layer on the above glass substrate at ambient temperature using a roll laminator with peeling the second protective film. An air pressure was 3 kg/cm$^2$, and a laminating speed was 1.0 m/min.

3-7. Evaluation

Ultraviolet ray was exposed to the water development-type photosensitive film layer by an ultra high pressure mercury lamp at an irradiation quantity of 300 mJ/cm$^2$ through a test pattern mask. Subsequently, after peeling the second support film, a spray development for 30 seconds was performed using water at a liquid temperature of 30° C. at a spray pressure of 3 kg/cm$^2$ to form a pattern. Adhesiveness and a pattern shape of the resultant pattern were evaluated. Consequently, a remaining minimum line width was 60 μm, and the good pattern shape was obtained.

However, when in order to evaluate shape stability of the pattern after the firing, the pattern was formed by the above methods and the firing treatment where the temperature was raised at a rising speed of 1.0° C./min and retained at 580° C. for 30 min was given, cracks occurred at the pattern end parts of the dielectric layer after the firing.

INDUSTRIAL APPLICABILITY

According to the invention, by providing an intermediate layer composition containing a thermally decomposable resin between a lower layer composition containing inorganic powder and a binder resin and an upper layer composition containing inorganic powder, a binder resin, a photopolymerizable monomer and a photopolymerization initiator, the lower layer and the upper layer lose organic contents to shrink during the intermediate layer being thermally degraded, and subsequently the lower layer and the upper layer are integrated. Therefore, it is possible to prevent cracks which occur due to the shrinkage in an uneven thickness state and obtain a good firing pattern.

And when a pattern is formed with the desired shape on the upper layer and subsequently all organic contents are eliminated by firing to yield a dielectric, a concavoconvex pattern derived from the upper layer is formed on the surface thereof. When fabricating the PDP, it is possible to assure paths to introduce a discharge gas to each cell from a concave parts of the dielectric by adapting a concavoconvex face of the dielectric derived from the upper layer to a barrier rib. As described above, it is possible to simply form the gas introduction paths by collectively firing the respective layers to form the dielectric, therefore, enhance the working efficiency of the fabrication steps of plasma display panels and shorten the tact time per panel.

The invention claimed is:

1. A composition for a dielectric of a plasma display panel laminating a plurality of layers, comprising:
   a lower layer composition containing inorganic powder and a binder resin;
   an upper layer composition containing inorganic powder, a binder resin, a photopolymerizable monomer and a photopolymerization initiator, the upper layer composition being provided above the lower layer; and
   an intermediate layer composition containing a thermally decomposable resin, the intermediate layer composition being provided between the lower layer and the upper layer,
   wherein the laminated plurality of layers are integrated due to firing.

2. A composition for a dielectric of a plasma display panel laminating a plurality of layers, comprising:
- a lower layer composition containing inorganic powder and a binder resin;
- an upper layer composition containing inorganic powder, a binder resin, a photopolymerizable monomer and a photopolymerization initiator, the upper layer composition being provided above the lower layer; and
- an intermediate layer composition containing a thermally decomposable resin, the intermediate layer composition being provided between the lower layer and the upper layer,
- wherein a remaining amount of the thermally decomposable resin is 50% or less when the thermally decomposable resin is heated to 600° C. at SOC/min and treated with heat at 600° C. for 20 min.

3. The composition for the dielectric of the plasma display panel as claimed in claim 1, wherein the thermally decomposable resin is a resin different from the binder resin.

4. A composition for a dielectric of a plasma display panel laminating a plurality of layers, comprising:
- a lower layer composition containing inorganic powder and a binder resin:
- an upper layer composition containing inorganic powder. a binder resin, a photopolymerizable monomer and a photopolymerization initiator, the upper layer composition being provided above the lower layer; and
- an intermediate layer composition containing a thermally decomposable resin, the intermediate layer composition being provided between the lower layer and the upper layer.
- wherein the thermally decomposable resin is a resin different from the binder resin, and
- wherein the thermally decomposable resin is water-soluble and the binder resin in the lower layer is hardly soluble in water.

5. A composition for a dielectric of a plasma display panel laminating a plurality of layers, comprising;
- a lower layer composition containing inorganic powder and a binder resin;
- an upper layer composition containing inorganic powder, a binder resin, a photopolymerizable monomer and a photopolymerization initiator, the upper layer composition being provided above the lower layer; and
- an intermediate layer composition containing a thermally decomposable resin, the intermediate layer composition being provided between the lower layer and the upper layer,
- wherein at least one of the lower layer composition and the intermediate layer composition further contains a light absorbent which absorbs light having 300 nm to 450 nm wavelength.

* * * * *

UNITED STATES PATENT AND TRADEMARK OFFICE
CERTIFICATE OF CORRECTION

PATENT NO. : 7,554,270 B2
APPLICATION NO. : 10/554657
DATED : June 30, 2009
INVENTOR(S) : Hitoshi Setsuda et al.

It is certified that error appears in the above-identified patent and that said Letters Patent is hereby corrected as shown below:

In column 14, line 46, delete "55/4.5" and insert -- 55/45 --, therefor.

In column 19, line 24, delete "powder. a binder" and insert -- powder, a binder --, therefor.

Signed and Sealed this

Third Day of November, 2009

David J. Kappos
*Director of the United States Patent and Trademark Office*